March 23, 1937.  J. W. TATTER  2,074,763
BRAKE
Filed June 30, 1930   2 Sheets-Sheet 1

INVENTOR
John W. Tatter
BY
ATTORNEY

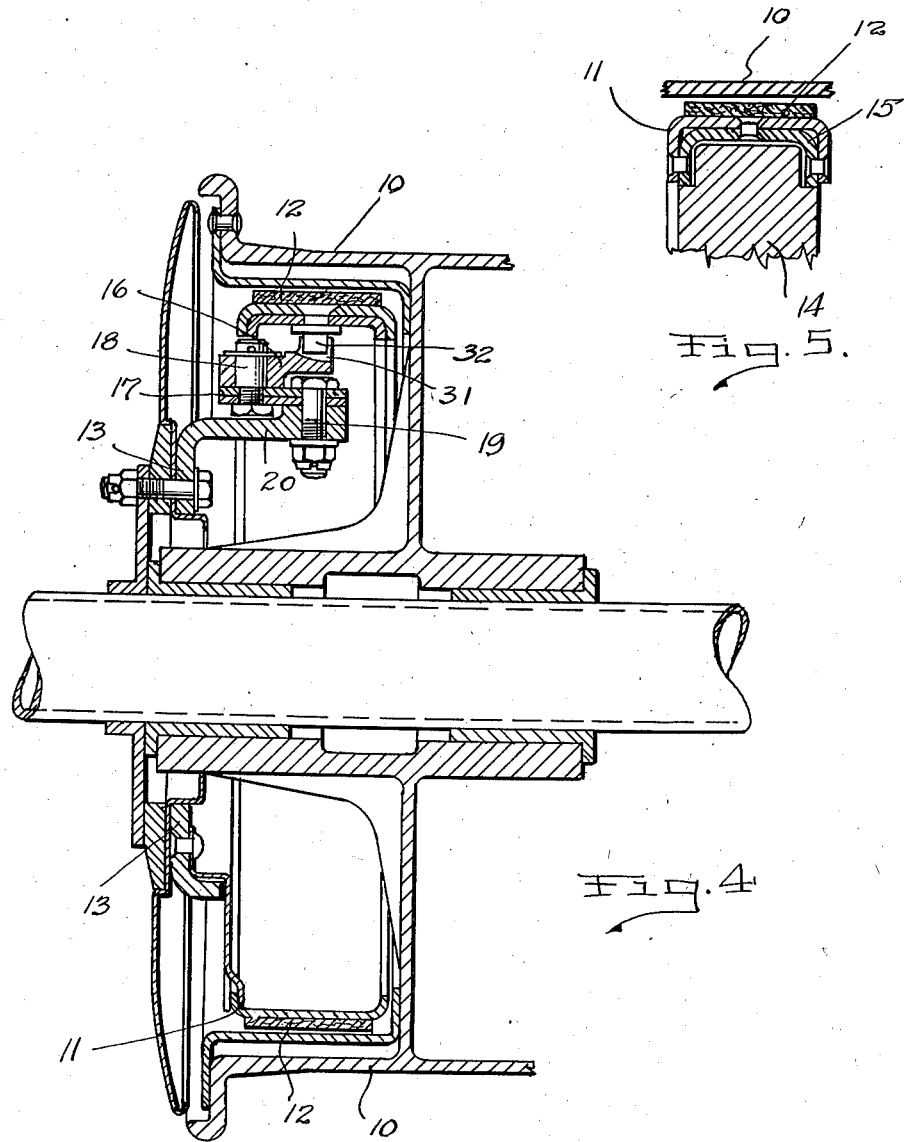

Patented Mar. 23, 1937

2,074,763

UNITED STATES PATENT OFFICE 2,074,763

BRAKE

John W. Tatter, Detroit, Mich., assignor, by mesne assignments, to Bendix Products Corporation, South Bend, Ind., a corporation of Indiana Application June 30, 1930, Serial No. 464,809

34 Claims. (Cl. 188—78)

My invention relates to brakes and more particularly to braking mechanisms adapted for use with airplane vehicles and the like, wherein it is customary to provide braking mechanism for checking only the forward movement of the plane since the plane is never driven in reverse, as is the automobile vehicle which is provided with braking mechanism for checking both forward and reverse movements.

An object of my invention is to facilitate the operation of a brake mechanism for airplane vehicles by providing a braking mechanism which may be more efficiently actuated and which will more evenly grip the brake drum in applying the brakes.

Another object of my invention is to facilitate the maintenance of airplane vehicle brakes by providing a braking mechanism for checking the forward movement of the plane and which is provided with means permitting the ready adjustment of the braking mechanism for maintaining a proper clearance between the brake lining and braking surface of the drum.

A further object of my invention is to provide a braking mechanism for airplane vehicles which may be economically manufactured and assembled with the plane by providing a mechanism containing a minimum number of parts that may be quickly assembled together, said assembly being adapted to be readily assembled to the airplane vehicle with a minimum of time and labor.

Figure 2:
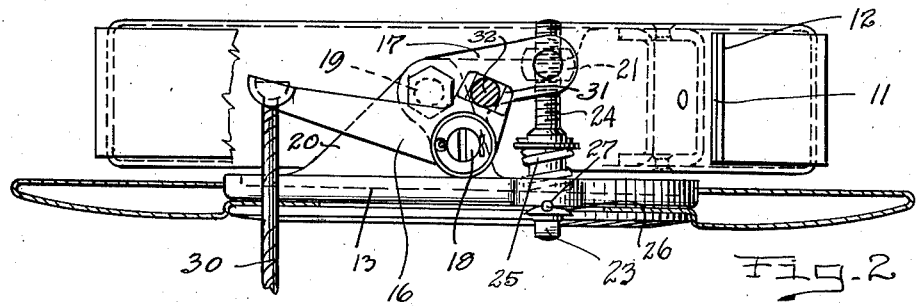
Figure 1:
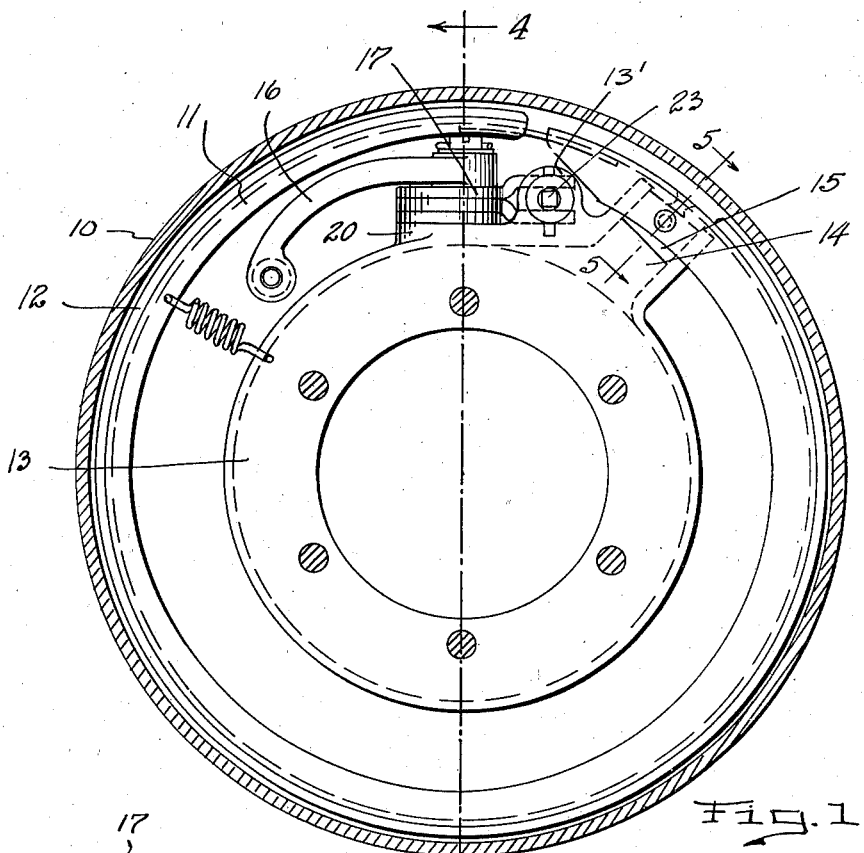
Figure 3:
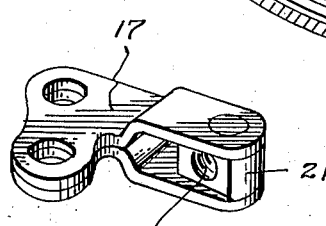

For a more detailed understanding of my invention, reference may be had to the accompanying drawings which illustrate one form which my invention may assume, and in which:

Fig. 1 is an elevational view of a braking mechanism for an airplane vehicle constructed in accordance with my invention and showing the brake shoe, actuating mechanism, and the brake drum, Fig. 2 is a plan view of the braking mechanism shown in Figure 1 with a portion of the shoe broken away to show the brake actuating means, Fig. 3 is a detail view in perspective of the bell crank support for pivotally supporting the brake shoe actuating means or crank, Fig. 4 is a vertical transverse sectional view taken substantially on the line 4—4 of Fig. 1, Fig. 5 is a detail transverse sectional view of the means for fixing one end of the brake shoe to the brake drum taken substantially on the line 5—5 of Fig. 1, The braking mechanism illustrated in the accompanying drawings is especially adapted for use with airplane vehicles and the like, and includes a brake drum 10 which is secured to the airplane wheel (not shown) and rotatable therewith. I preferably provide a braking mechanism of the internal expanding type adapted for assembly with the brake drum and which preferably includes a single brake shoe 11 extending substantially around the entire internal circumference of the brake drum, and which has secured thereto a lining structure 12 adapted for engagement with the braking surface of the brake drum structure. A supporting fixture 13 is secured to the shaft housing by means of bolts or other suitable fastening devices and is thus rigidly supported and held stationary with respect to the rotating brake drum. This support is provided with a radially extending lug 14 that is adapted to project within a retainer cup 15 carried by the brake shoe 11, thus fixing the brake shoe against substantial movement circumferentially of the brake drum.

The free end of the brake shoe, which is preferably located closely adjacent to the fixed end of the shoe, is adapted to be engaged by a brake actuating mechanism which may be actuated to expand the brake shoe for engaging the same with the brake drum for checking the rotation of said drum. This brake actuating mechanism comprises a bell crank 16 that is pivoted to a second bell crank 17 by means of a pin 18, the second bell crank 17 being pivoted as at 19 to a bracket 20, that preferably is integrally carried by the fixture 13. It is noted that the second bell crank 17 as well as the first mentioned bell crank 16 are preferably supported to swing or move in a plane that extends substantially at right angles to a plane which extends perpendicular to the axis of the brake drum. The bell crank 16 is pivoted to one arm of the bell crank 17 and the other arm of the bell crank 17 is provided with a pivotally supported block 21, that is provided with an internally threaded or tapped hole 22.

An adjusting screw or stud 23 having a reduced externally threaded portion 24, is supported by a lug 13' secured to the fixture 13, the threaded portion being threaded into the block 21 carried by the bell crank 17. A spring 25 under compression exerts a force to yieldingly project the stud 23 inwardly of the brake drum and to retain the locating pin 26 in a cooperating slot 27 of the plate 13' so that the stud is held in any of its adjusted positions. By turning the adjusting screw or stud 23 the bell crank 17 may be swung about its pivot thereby moving the point of support for the bell crank 16 for varying the clearance between the brake shoe and brake drum. As the brake lining carried by the brake shoe wears the bell crank 17 may be moved by means of the adjusting screw in a clockwise direction as viewed in Figure 2, thereby moving the pivot point 17 to the left and expanding the brake shoe to take up a portion of the clearance between the shoe and drum to compensate for the wear of the brake lining.

The crank 16 is provided with means at one end of one of its arms for engagement with a draft member 30, so that a pull on the draft member 30 will actuate the crank 16 about its pivot. The other arm of the crank 16 is provided with a yoke 31 in which a pin 32 is engaged, said pin being carried by the free end of the brake shoe. As the crank 16 is actuated the brake shoe may be expanded or contracted to respectively apply or release the brakes.

It will be noted that the braking mechanism is constructed to permit a connection of the brake shoe and brake shoe actuating means to be located at a point substantially equidistant of the edges of the shoe, thereby providing a more uniform distribution of the forces. Furthermore, the construction of the actuating mechanism, which is arranged to be operatively moved in a plane extending substantially at right angles to a plane extending substantially perpendicular to the axis of the brake drum, permits the mechanism to be readily adjusted thereby facilitating the maintenance of the mechanism. Such a construction, as I have illustrated in my drawings may be readily and economically assembled together, the said assembled braking mechanism being very readily assembled with the brake drum carried by the airplane vehicle wheel.

Although I have illustrated but one form of my invention and have described in detail but a single application thereof, it will be apparent to those skilled in the art to which my invention pertains that various modifications and changes may be made therein without departing from the spirit of my invention or from the scope of the appended claims.

What I claim as my invention is:

1. In a brake, the combination of a brake drum, a brake shoe having one end fixed against relative movement circumferentially of the brake drum, said brake shoe having the other of its ends located adjacent its fixed end, and a bell crank operatively connected with the free end of the brake shoe and supported for operative movement in a plane extending substantially at right angles to a plane extending perpendicular to the axis of the brake drum, said bell crank having a curved lever arm extending longitudinally in a transverse direction relative to the axis of said brake drum.

2. In a brake, the combination of a brake drum, a brake shoe having one end fixed against relative movement circumferentially of the brake drum, a bell crank operatively connected with the free end of the brake shoe and arranged for operative movement in a plane extending substantially at right angles to a plane extending perpendicular to the axis of the brake drum, and a second bell crank arranged to pivotally support said first mentioned bell crank, said second bell crank adjustably supported to move in a plane substantially parallel with the plane in which the first mentioned bell crank is operatively moved.

3. In a brake, the combination of a brake arm, a brake shoe having one end fixed against relative movement circumferentially of the brake drum, a bell crank operatively connected with the free end of the brake shoe and arranged for operative movement in a plane extending substantially at right angles to a plane extending perpendicular to the axis of the brake drum, and a second bell crank arranged to pivotally support said first mentioned bell crank, said second bell crank pivotally supported and manually adjustable to swing in a plane substantially parallel with the plane in which the first mentioned bell crank is operatively moved.

4. In a brake, the combination of a brake drum, a brake shoe having one end fixed against relative movement circumferentially of the brake drum, a bell crank operatively connected with the free end of the brake shoe and a pivotally mounted support for said bell crank, said support having its pivot located approximately on the vertical center of said brake drum.

5. In a brake, the combination of a brake drum, a brake shoe having one end fixed against relative movement circumferentially of the brake drum, means operatively connected with the free end of the brake shoe, and an adjustable support for said means, said support being located between said means and the axis of said brake drum.

6. In a brake, the combination of a brake drum, a brake shoe having one end fixed against relative movement circumferentially of the brake drum, means operatively connected with the free end of the brake shoe, and a second adjustable means for pivotally supporting said first mentioned means.

7. In a brake, the combination of a brake drum, a brake shoe having one of its ends fixed against relative movement circumferentially of said brake drum, said brake shoe having an end adjacent its fixed end, and an adjustably mounted bell crank for actuating said brake shoe to engage said brake drum, said bell crank being arranged for movement in a plane extending parallel to the axis of said brake drum.

8. In a brake, the combination of a brake drum, a brake shoe for engaging said brake drum, a bracket within said brake drum, said bracket being suitably mounted, an adjustably mounted member on said bracket, and a member for actuating said brake shoe, said last mentioned member being mounted on said adjustably mounted member.

9. In a brake, the combination of a brake drum, a brake shoe engaging said brake drum, said brake shoe having its ends adjacent one another, and a lever for actuating said brake shoe, said lever being arranged for movement in a plane extending parallel with the axis of said brake drum, said lever being provided with a forked portion for engaging said brake shoe.

10. In a brake, the combination of a brake drum, brake shoe means for engaging said brake drum, a single lever member for actuating said brake shoe means, and means for adjusting the position of said single lever member, said last mentioned means including a member swivelly connected to a pivotally mounted member.

11. In a brake mechanism comprising a brake drum, a brake shoe, bell crank means for actuating the brake mechanism, said means including a bell crank provided with a curved lever arm extending longitudinally adjacent the inner surface of said brake shoe.

12. In a brake, the combination of a brake shoe, a member projecting inwardly from said brake shoe, and a bell crank suitably mounted, said bell crank slidably engaging said member projecting inwardly from said brake shoe.

13. In a brake, the combination of a brake drum, a brake shoe, means for actuating said brake shoe to engage said brake drum, and means for adjusting said last mentioned means, said means extending parallel with the axis of said brake drum.

14. In a brake actuating mechanism, the combination of a bell crank pivotally mounted, said bell crank being provided with a forked portion, a threaded member pivotally mounted in the forked portion of said bell crank, and adjustable means engaging said threaded member.

15. In a brake, the combination of a brake drum, a brake shoe, anchorage means for said brake shoe, a bell crank for actuating said brake shoe to engage said brake drum, a bell crank pivotally connected with said first mentioned bell crank, an adjustable member suitably mounted in said anchorage means and operatively connected with said last mentioned bell crank, said adjustable means extending within said brake drum in a plane parallel with the axis of said brake drum, indexing means suitably engaging said adjustable means and said anchorage means, said indexing means being located outside of said brake drum, and resilient means for maintaining said indexing means in engagement.

16. In a brake actuating means, the combination of a bell crank, a support member for said bell crank, said support member being pivotally mounted, and an adjustable member extending within said brake drum in a plane parallel with the axis of said brake drum, said adjustable member being swivelly connected with said support member.

17. In a brake, the combination of anchorage means provided with a radial boss, a brake shoe, a cup suitably mounted on said brake shoe, said cup engaging the radial boss of said anchorage means, a brake drum, and pivotally mounted means within said brake drum for actuating said brake shoe radially on the radial boss of said anchorage means.

18. In a brake, the combination of a brake drum, anchorage means provided with a radial boss, a brake shoe engaging the radial boss of said anchorage means to prevent said brake shoe from moving circumferentially relative to said brake drum, and bell crank means suitably mounted on said anchorage means for actuating said brake shoe to engage said brake drum, said bell crank means being located adjacent the radial boss of said anchorage means.

19. In a brake, the combination of a brake shoe, a slidably mounted cup member attached to said brake shoe, and a pivotally mounted bell crank for slidably moving said brake shoe together with said cup member.

20. In a brake, the combination of a brake drum, a brake shoe having one end fixed against relative movement circumferentially of the brake drum, said brake shoe extending around said brake drum and having a free end limited adjacent to its anchored end, and actuating means operatively connected with the free end of the brake shoe and supported for operative movement in a plane extending parallel to the axis of said brake drum, said actuating means being pivotally supported solely on a pair of pivot shafts.

21. In a brake, the combination of a brake drum, a brake shoe having one of its ends anchored, relative to movement circumferentially of said brake drum, adjacent a free end, a bell crank operatively connected with the free end of said brake shoe, said bell crank being suitably supported to provide operative movement in a plane extending substantially at right angles to a plane extending perpendicular to the axis of said brake drum, and a draft member for actuating said bell crank, said draft member extending substantially parallel with respect to the axis of said brake drum.

22. In a brake, the combination of a brake drum, a brake shoe having one end fixed against relative movement circumferentially of said brake drum, a bell crank operatively connected with the free end of said brake shoe, an oscillating member supporting said bell crank, and means adjustably connected with said oscillating member to change the location of the fulcrum point of said bell crank, said means extending between said oscillating member and the fixed end of said brake shoe.

23. In a brake, the combination of a brake drum, a brake shoe having one of its ends fixed against relative movement circumferentially of said brake drum, a lever member operatively connected with the free end of said brake shoe, said lever member having its fulcrum point adjacent the free end of said brake shoe, and an oscillating member for supporting said lever member, said oscillating member having its fulcrum point adjacent the fulcrum point of said lever member, and an adjustable member operatively connected with said oscillating member, said adjustable member extending in a plane parallel with the axis of said brake drum.

24. In a brake, the combination of a brake drum, a brake shoe having one end fixed against relative movement circumferentially of said brake drum, a lever member pivotally connected to said brake shoe, a lever member pivotally connected to said first mentioned lever member, said last mentioned lever member being pivotally mounted, and means for locking said last mentioned member against pivotal movement.

25. In a brake, the combination of a brake drum, a brake shoe having a free end together with an anchored end, a lever member pivotally connected to the free end of said brake shoe at a point located between the free end of said brake shoe and the axis of said brake drum, said lever member being pivotally supported in closer proximity to the axis of said brake drum than the pivotal connection of said brake shoe and said lever member, and a second lever pivotally supporting said first mentioned lever, said second mentioned lever being pivotally supported in closer proximity to the axis of said brake drum than the pivotal support of said first mentioned lever.

26. In a brake mechanism comprising a fixed housing, the combination of a brake drum, a brake shoe, means for actuating said brake shoe, said means including a threaded swivel member, an adjusting member threadably engaging the threaded swivel member of said means, said adjusting member being provided with a portion having a bearing in the fixed housing of the brake mechanism, said adjusting member being provided with an index member engaging the fixed housing of the brake mechanism, and resilient means for maintaining said index member in engagement with the fixed housing of the brake mechanism.

27. In a brake, the combination of a brake drum having an open portion, a brake shoe suitably mounted and adapted to be operated by the application of pressure adjacent one of its ends only, a lever member suitably mounted and adapted to exert a pressure on and adjacent one end only of said brake shoe, a fixed member adjacent the open portion of said brake drum, and a draft member connected with said lever member, said draft member extending through said fixed member.

28. In a brake, the combination of a brake drum, a brake shoe having an anchored portion and a portion adapted to be actuated, a bell crank lever operatively connected with the end of the brake shoe adapted to be actuated and a fixed lever operatively connected with the bell crank lever and means for adjusting said fixed lever to adjust the brake.

29. In a brake, the combination of a brake drum, a brake shoe having an anchored portion and a portion adapted to be actuated, a bell crank lever operatively connected with the end of the brake shoe adapted to be actuated, a fixed lever operatively connected with the bell crank, means supported by said fixed lever about which the bell crank is fulcrumed, and means for adjusting the fixed lever to adjust the brake.

30. In a brake, the combination of a brake drum, a brake shoe having an anchored portion and a portion adapted to be actuated, a lever adapted to be connected with the portion adapted to be actuated, a fixed lever operatively connected with the first lever, means supported by said fixed lever upon which the first lever is adapted to be pivoted, said levers lying substantially in the same plane, and means for adjusting said fixed lever to adjust the brake.

31. In a brake, the combination of a brake drum, a brake shoe having an anchored portion and a portion adapted to be actuated, a lever operatively connected with the end of the brake shoe adapted to be actuated, a fixed lever operatively connected with the first lever, and means for adjusting said fixed lever to adjust the brake.

32. In a brake, the combination of a brake drum, a brake shoe having an anchored portion and a portion adapted to be actuated, a lever operatively connected with the end of the brake shoe adapted to be actuated, a fixed lever operatively connected with the first lever, and means for adjusting said second lever to adjust the brake, a fixed support for said fixed lever and means for adjusting said second lever relatively to its fixed support to adjust the brake.

33. In a brake, the combination of a brake drum, a brake shoe having an anchored portion and a portion adapted to be actuated, a lever adapted to be connected with the portion adapted to be actuated, a fixed lever operatively connected with the first lever, means supported by said fixed lever upon which the first lever is adapted to be pivoted, said levers lying substantially in the same plane, and means acting in a plane substantially common to the plane of said levers for exerting operating force upon said brake.

34. In a brake, the combination of a brake drum, a brake shoe having an anchored portion and a portion adapted to be actuated, a lever adapted to be connected with the portion adapted to be actuated, a fixed lever operatively connected with the first lever, means supported by said fixed lever upon which the first lever is adapted to be pivoted, said levers lying substantially in the same plane, said fixed lever being adjustably mounted, whereby the adjustment of said fixed lever serves to adjust the brake.

JOHN W. TATTER.